United States Patent [19]
Manico et al.

[11] Patent Number: 5,708,879
[45] Date of Patent: Jan. 13, 1998

[54] FILM CARTRIDGE WITH VISUAL EXPOSURE STATUS INDICATOR

[75] Inventors: Joseph A. Manico; John A. Agostinelli, both of Rochester, N.Y.

[73] Assignee: Eastman Kodak Company, Rochester, N.Y.

[21] Appl. No.: 781,766

[22] Filed: Jan. 10, 1997

[51] Int. Cl.$^6$ .................................................. G03B 17/26
[52] U.S. Cl. ......................................... 396/207; 396/515
[58] Field of Search .................................. 396/207, 208, 396/515, 511

[56] References Cited

U.S. PATENT DOCUMENTS 5,153,627  10/1992  Dwyer ................................. 354/217

*Primary Examiner*—Safet Metjahic
*Assistant Examiner*—Nicholas J. Tuccillo

*Attorney, Agent, or Firm*—Roger A. Fields

[57] ABSTRACT

A film cartridge comprising a cartridge housing, a film spool rotatable inside the cartridge housing, and a film exposure status indicator capable of changing state to provide a visual indication of the exposure status of a filmstrip for the film cartridge, is characterized in that a ring having a radial slit coaxially engages the film spool to be rotated concurrently with the film spool, and the indicator is a flexible helix coiled around the film spool and extending through the slit, with one end portion of the helix fixed in place beneath the ring to be concealed from view and to prevent rotation of the helix when the ring is rotated with the film spool, and a further portion of the helix initially located above the ring to be visible but which is adapted to be compressed beneath the ring to disappear from view responsive to movement of the slit along the further portion when the ring is rotated with the film spool, to provide a change of state of the helix from being visible above the ring to being concealed beneath the ring.

7 Claims, 2 Drawing Sheets

1

FILM CARTRIDGE WITH VISUAL EXPOSURE STATUS INDICATOR

FIELD OF THE INVENTION

The invention relates generally to the field of photography, and in particular to a film cartridge with a visual exposure status indicator for indicating whether a filmstrip inside the cartridge housing is unexposed or exposed. More specifically, the invention relates to a film exposure status indicator that can be used with a conventional type cartridge.

BACKGROUND OF THE INVENTION

It is known for a film cartridge to have a film exposure status indicator for providing a visual indication that a filmstrip inside the cartridge housing has been exposed. Often, the film exposure status indicator is one which cannot be used with a conventional type cartridge, but instead requires a special or new cartridge.

For example, prior art U.S. Pat. No. 5,278,600, issued Jan. 11, 1994, discloses an atypical film cartridge comprising a film spool rotatable inside the cartridge housing, an indicator window in an end cap of the cartridge housing, an annular indicator wheel rotatable inside the cartridge housing behind the indicator window to move a film exposed indication on the indicator wheel to the indication window, and an annular drive wheel rotatably linked with the film spool for rotating the indicator wheel to move the film exposed indication to the indication window. A pin and receiver clutch device transmits movement of the drive wheel to the indicator wheel when the film spool is rotated in a film unwinding direction, and leaves the indicator wheel and the drive wheel disconnected when the film spool is rotated in a film winding direction. Since the indicator wheel is located inside the cartridge housing, it cannot be used with a conventional type cartridge.

SUMMARY OF THE INVENTION

A film cartridge comprising a cartridge housing, a film spool rotatable inside the cartridge housing, and a film exposure status indicator capable of changing state to provide a visual indication of the exposure status of a filmstrip for the film cartridge, is characterized in that:

a ring having a radial slit coaxially engages the film spool to be rotated concurrently with the film spool; and the indicator is a flexible helix coiled around the film spool and extending through the slit, with one end portion of the helix fixed in place beneath the ring to be concealed from view and to prevent rotation of the helix when the ring is rotated with the film spool, and a further portion of the helix initially located above the ring to be visible but which is adapted to be compressed beneath the ring to disappear from view responsive to movement of the slit along the further portion when the ring is rotated with the film spool, to provide a change of state of the helix from being visible above the ring to being concealed beneath the ring.

The ring and the helix are designed to fit on a protruding end portion of the film spool which projects from the cartridge housing and, therefore, can be used with a conventional type cartridge.

DETAILED DESCRIPTION OF THE INVENTION

The invention is disclosed as being embodied preferably in a conventional type 35 mm film cartridge. Because the features of a 35 mm film cartridge are generally known, the description which follows is directed in particular only to those elements forming part of or cooperating directly with the disclosed embodiment. It is to be understood, however, that other elements may take various forms known to a person of ordinary skill in the art.

Figure 1:
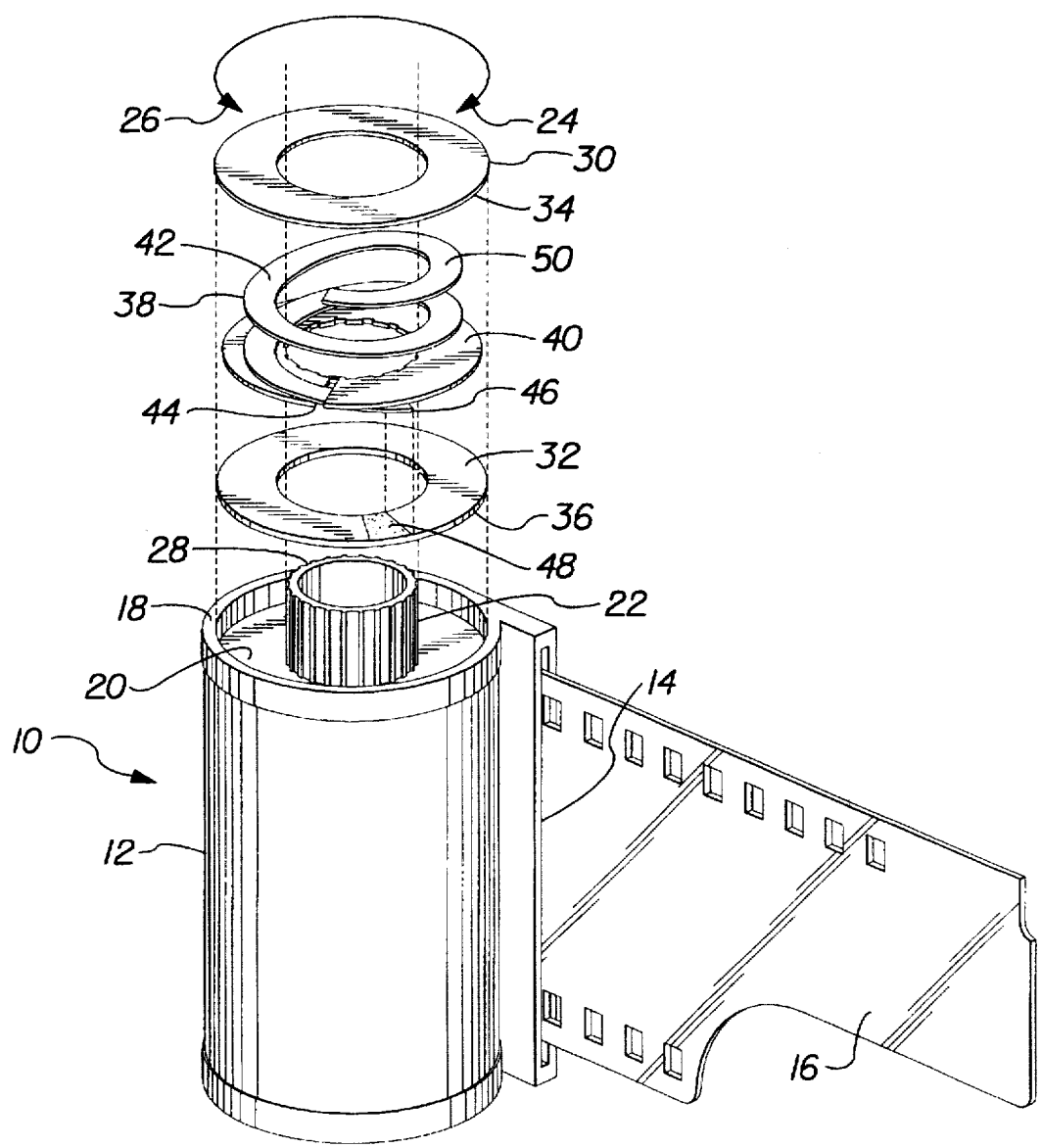
FIG. 1 is an exploded perspective view of a film cartridge with a film exposure status indicator according to a preferred embodiment of the invention, showing the indicator in a visible state.

Referring now to the drawings, FIG. 1 shows a 35 mm film cartridge 10 comprising a cartridge housing 12 having a plush-lined light-trapping film egress/ingress opening 14 for a filmstrip 16 and a peripherally raised end cap 18 that forms an open-top recess 20. A flanged film spool 22 rotatable inside the cartridge housing 12 in opposite film unwinding and rewinding directions 24 and 26 has a protruding spool end portion 28 coaxially projecting from the cartridge housing into the recess 20.

Within the recess 20, there is provided a top ring 30 which is transparent, and a bottom ring 32 which is adhered on its underside to the cartridge housing 12. The top and bottom rings 30 and 32 have the same diameter, and are spaced apart except for being attached to each other at their respective outer peripheral edges 34 and 36. A flexible, multi-convolution, film exposure status indicator helix 38 and an intermediate ring 40 are movably positioned between the top and bottom rings 30 and 32. See FIG. 1. The intermediate ring 40 has a diameter that is less than the diameter of the top and bottom rings 30 and 32, and the helix 38 has a diameter that is less than the diameter of the intermediate ring. The spool end portion 28 extends through the top, intermediate and bottom rings 30, 40 and 32, and the helix 38. The top and bottom rings 30 and 32, although being fixed in place, do not impede rotation of the spool end portion 28 in the film unwinding and rewinding directions 24 and 26. The helix 38 has printed indicia, not shown, on its top side such as "FRESH FILM" or "UNEXPOSED FILM".

The intermediate ring 40 has a single radial slit 44, and coaxially engages the spool end portion 28 between the top and bottom rings 30 and 32 to be rotated concurrently with the spool end portion in the film unwinding and rewinding directions 24 and 26. See FIG. 1.

Figure 2:
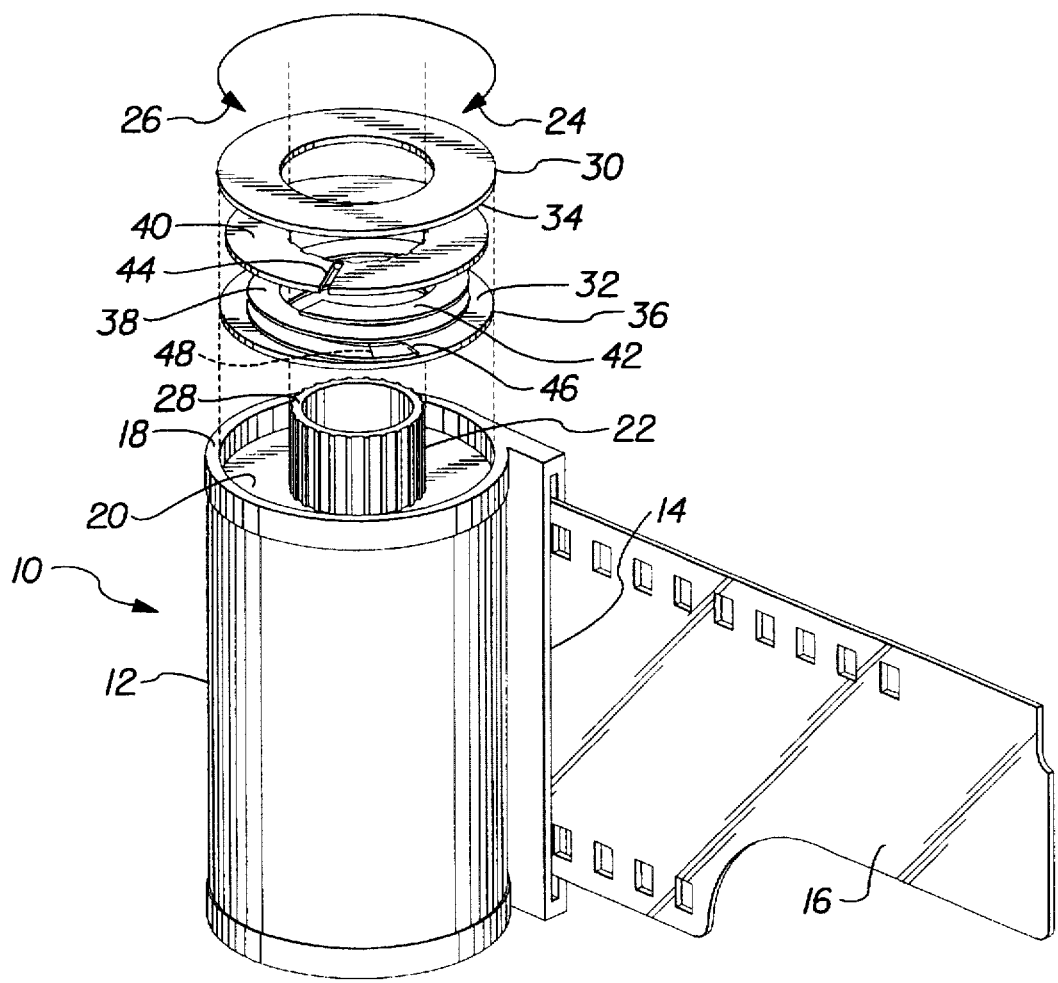
FIG. 2 is an exploded perspective view of the film cartridge with the film exposure status indicator, showing the indicator in a concealed state.

As shown in FIG. 1, the helix 38 is loosely coiled around the spool end portion 28 between the top and bottom rings 30 and 32 and longitudinally extends through the radial slit 44 in the intermediate ring 40. One end portion 46 of the helix 38 which is significantly less than a single convolution is located beneath the intermediate ring 40 to not be visible through the top ring 30, and is adhered to an adhesive patch 48 on the bottom ring 32 to prevent rotation of the helix when the intermediate ring is rotated with the spool end portion 28 in the film unwinding and rewinding directions 24 and 26. A remaining (much longer) portion 50 of the helix 38 is initially located above the intermediate ring 40 to be visible through the top ring 30 but, as shown in FIG. 2, the remaining portion is intended to be compressed beneath the intermediate ring to disappear from view responsive to movement of the radial slit 44 along the remaining portion when the intermediate ring is rotated with the spool end portion 28 in the film unwinding direction 24. Thus, the helix 38 can change state from being visible to not being visible.

The helix 38 continues to be compressed beneath the intermediate ring 40 when the intermediate ring is rotated with the spool end portion 28 in the film rewinding direction 26, to continue not being visible.

As shown in FIG. 1, the remaining portion 50 of the helix 38 has at least two convolutions around the spool end portion 28 to require at least two revolutions of the film spool 22 in the film unwinding direction 24 for the intermediate ring 40 to compress the remaining portion beneath the intermediate ring 40. This ensures that at least two convolutions of the filmstrip 16 are unwound off the film spool 22 when the film spool is rotated in the unwinding direction 24. Usually, unwinding two convolutions of the filmstrip 16 is a sufficient film length to achieve film loading in a compact camera.

The invention has been described with reference to a preferred embodiment. However, it will be appreciated that variations and modifications can be effected by a person of ordinary skill in the art without departing from the scope of the invention.

PARTS LIST 10. film cartridge
12. cartridge housing
14. film egress/ingress opening
16. filmstrip
18. peripherally raised end cap
20. open-top recess
22. film spool
24. film unwinding direction
26. film rewinding direction
28. protruding spool end portion
30. top ring
32. bottom ring
34. peripheral edge
36. peripheral edge
38. film exposure status indicator helix
40. intermediate ring
42. top side
44. radial slit
46. one end portion
48. adhesive patch
50. remaining (further) portion

What is claimed is:

1. A film cartridge comprising a cartridge housing, a film spool rotatable inside said cartridge housing, and a film exposure status indicator capable of changing state to provide a visual indication of the exposure status of a filmstrip for said film cartridge, is characterized in that:

a ring having a radial slit coaxially engages said film spool to be rotated concurrently with the film spool; and said indicator is a flexible helix coiled around said film spool and extending through said slit, with one end portion of said helix fixed in place beneath said ring to be concealed from view and to prevent rotation of the helix when the ring is rotated with said film spool, and a further portion of said helix initially located above said ring to be visible but which is adapted to be compressed beneath the ring to disappear from view responsive to movement of said slit along said further portion when the ring is rotated with said film spool, to provide a change of state of said helix from being visible above said ring to being concealed beneath the ring.

2. A film cartridge as recited in claim 1, wherein said film spool is rotatable in a film unwinding direction, and said ring is rotated with said film spool in the film unwinding direction to compress said further portion of the helix beneath the ring.

3. A film cartridge as recited in claim 1, wherein said further portion of the helix has at least two convolutions around said film spool to require at least two revolutions of the film spool for said ring to compress the further portion of the helix beneath the ring.

4. A film cartridge comprising a cartridge housing, a film spool rotatable inside said cartridge housing in opposite film unwinding and rewinding directions and having a protruding spool end portion coaxially projecting from the cartridge housing, and a film exposure status indicator capable of changing state to provide a visual indication of the exposure status of a filmstrip for said film cartridge, is characterized in that:

a ring having a radial slit coaxially engages said spool end portion to be rotated concurrently with said film spool in the film unwinding and rewinding directions; and said indicator is a flexible helix coiled around said spool end portion and longitudinally extending through said slit, with one end portion of said helix fixed in place beneath said ring to be concealed from view and to prevent rotation of the helix when the ring is rotated with said film spool in the film unwinding and rewinding directions, and a further portion of said helix initially located above said ring to be visible but which is adapted to be compressed beneath the ring to disappear from view responsive to movement of said slit along said further portion when the ring is rotated with said film spool in the film unwinding direction, to provide a change of state of said helix from being visible to not being visible, and which continues to be compressed beneath said ring when the ring is rotated with said film spool in the film rewinding direction, to remain not being visible.

5. A film cartridge as recited in claim 4, wherein said film cartridge has a peripherally raised end cap which forms a recess surrounding said protruding spool end portion, and said ring and said helix are located in said recess with said one end portion of the helix being fixed in place between the ring and said end cap.

6. A film cartridge as recited in claim 4, wherein said helix has a diameter that is less than the diameter of said ring.

7. A film cartridge comprising a cartridge housing with a peripherally raised end cap which forms an open recess, a film spool rotatable inside said cartridge housing in opposite film unwinding and rewinding directions and having a protruding spool end portion coaxially projecting from the cartridge housing into said recess, and a film exposure status indicator capable of changing state to provide a visual indication of the exposure status of a filmstrip for said film cartridge, is characterized in that:

a ring having a radial slit coaxially engages said spool end portion in said recess to be rotated in the recess with said spool end portion in the film unwinding and rewinding directions; and said indicator is a flexible multi-convolution helix loosely coiled around said spool end portion in said recess and longitudinally extending through said slit, with only one end portion of said helix which is less than a single convolution located beneath said ring to not be visible and fixed in place to prevent rotation of the helix when the ring is rotated with said spool end portion in the film unwinding and rewinding directions, and a remaining portion of said helix initially located above said ring to be visible but which is adapted to be compressed beneath the ring to disappear from view responsive to movement of said slit along said remaining portion when the ring is rotated with said spool end portion in the film unwinding direction, to provide a change of state of said helix from being visible to not being visible, and which continues to be compressed beneath said ring when the ring is rotated with said spool end portion in the film rewinding direction, to continue not being visible.

* * * * *